United States Patent [19]

Smith

[11] Patent Number: 4,532,599

[45] Date of Patent: Jul. 30, 1985

[54] QUALITY CONTROL METHOD

[75] Inventor: Stanley K. Smith, Fenton, Mich.

[73] Assignee: Eaton Corporation, Cleveland, Ohio

[21] Appl. No.: 407,398

[22] Filed: Aug. 12, 1982

[51] Int. Cl.³ .............................................. G06F 15/20
[52] U.S. Cl. .................................... 364/552; 364/474; 408/11
[58] Field of Search ........................ 318/561, 566, 646; 364/474, 475, 511, 552; 408/11

[56] References Cited

U.S. PATENT DOCUMENTS

| | | | |
|---|---|---|---|
| 3,545,310 | 12/1970 | Porath et al. | 408/11 |
| 3,675,517 | 7/1972 | Tadayoshi | 408/11 X |
| 3,698,268 | 10/1972 | Cutler | 318/571 X |
| 3,834,615 | 9/1974 | Watanabe et al. | 73/104 X |
| 3,878,982 | 4/1975 | Hoffman | 364/154 |
| 3,882,305 | 5/1975 | Johnstone | 364/551 |
| 4,090,403 | 5/1978 | Tuskada et al. | 73/104 |
| 4,131,837 | 12/1978 | Whetham | 364/474 X |
| 4,267,629 | 5/1981 | Eshghy | 73/761 X |
| 4,400,118 | 8/1983 | Yamakage et al. | 364/474 X |
| 4,451,187 | 5/1984 | Ishikawa et al. | 408/11 X |
| 4,451,892 | 5/1984 | McMurtry | 364/474 |

*Primary Examiner*—Errol A. Krass
*Assistant Examiner*—Edward R. Cosimano
*Attorney, Agent, or Firm*—C. H. Grace; M. L. Union

[57] ABSTRACT

A method of cutting material from a workpiece (10) while monitoring the quality of the workpiece includes the steps of:

supporting a workpiece, rotating a cutting tool (14) as it engages with the workpiece, moving the cutting tool and workpiece relative to each other through a cycle to enable the cutting tool to remove material from the workpiece, dividing each cycle of the cutting tool and workpiece into a plurality of incremental movements, sensing the torque required to effect relative rotation of the tool and workpiece during each of the incremental movements of the cycle, setting torque limits for different incremental movements in the cycle, and comparing the sensed torque exerted between the tool and workpiece with the set torque limits and generating a signal indicative of a workpiece of unacceptable quality if the sensed torque is not within the set torque limits.

11 Claims, 4 Drawing Figures

QUALITY CONTROL METHOD

BACKGROUND OF THE INVENTION

1. Field of the Invention

The present invention relates to a method of ascertaining the quality of a workpiece while the workpiece is being manufactured and more particularly to a method of testing the quality of a workpiece while removing material from the workpiece by sensing the applied forces to remove the material from the workpiece and utilizing the sensed applied forces to determine whether the workpiece meets predetermined quality standards.

Methods of testing workpieces are well known in the art. These methods include performing quality control measurements after the workpiece has been machined or performing destructive testing on samples of the workpiece to ascertain the quality of a plurality of workpieces. The known methods of performing quality control on a workpiece do not effect the quality of the workpiece as the workpiece is being machined.

2. Prior Art

The Eshghy Pat. No. 4,267,629 entitled Tension Control of Fasteners discloses the method for tensioning a threaded joint by sensing the torque utilized to tighten the joint over various angles of rotation of the nut. The Eshghy patent does not disclose quality control of mechanical assemblies other than threaded fasteners and has not been used for quality control of a workpiece which is being machined. The Cutler Pat. No. 3,698,268, discloses a Numerical Control System for Interrupted Cutting Conditions which includes a transistor which generates an electrical signal proportional to the force being exerted by the cutter. The force signal is compared with a preset value which is equal to the minimum force exerted by the cutter when it is in contact with the workpiece. The signals are used to indicate whether the cutter is either in contact with the workpiece, out of contact with the workpiece or performing an intermittant or interrupted cut such as occurs when the workpiece is out of round. These signals are used to provide control signals to the spindle to control the spindle speed and rate of feed of the cutter relative to the spindle. Cutler does not disclose performing a quality control operation on the workpiece as it is machined.

The Watanabe et al Pat. No. 3,834,615, discloses a machine tool control system wherein the reaction force on the cutting tool is detected in the form of three components, i.e. a backing force component, a feeding force component and a main force component. The sensed force values are then compared with corresponding reference values to detect abnormal conditions of the cutting tool. Watanabe et al also does not disclose a method of controlling the quality of the workpiece while it is machined. The Hoffman Pat. No. 3,878,982, discloses an Automatic Target Management Method and System which automatically and continuously senses dispersion of a measured property of process material and automatically controls the process to maintain a given fraction of the processed material on the proper side of the limiting value. Johnstone Pat. No. 3,882,305, discloses a diagnostic communication system for a computer controlled machine tool. The Johnstone patent is directed to a method of performing preventative maintenance on a computer controlled machine by collecting signals derived from the machine tool and analyzing the machines performance by comparing the parameters represented by the collected signals with design parameters for the machine. However, Johnstone does not disclose utilizing the collected perimeters to control the quality of a workpiece being machined. Tsukada et al Pat. No. 4,090,403, discloses an Apparatus For Judging The Useful Life of Tools but does not disclose a quality control operation for controlling the quality of a machined workpiece.

SUMMARY OF THE INVENTION

Accordingly, it is a provision of the present invention to provide a new and improved method of removing material from a workpiece while monitoring the quality of the workpiece including the steps of: supporting a workpiece, supporting a cutting tool, moving the cutting tool and workpiece relative to each other through a cycle to enable the cutting tool to remove material from the workpiece, dividing each cycle of the cutting tool and workpiece into a plurality of increments, sensing the force exerted between the tool and the workpiece during each of the increments, setting force limits for different increments of the cycle, comparing the sensed force exerted between the tool and workpiece with the set force limits and generating a first signal indicative of a workpiece of unacceptable quality if the sensed force is not within the set force limits.

Another provision of the present invention is to provide a new and improved method of removing material from a workpiece as set forth in the preceding paragraph wherein the step of setting force limits for different increments of a cycle includes the steps of: identifying physical characteristics of an acceptable workpiece, determining the position of the cutting tool with respect to an acceptable workpiece during each of the increments of the cycle, determining the force exerted between the acceptable workpiece and the tool to remove material from the acceptable workpiece during predetermined increments of the cycle during which the tool engages with the identified physical characteristics of the acceptable workpiece, and setting a maximum force limit for a particular increment of the cycle which is dependent upon the identified physical characteristic of the acceptable workpiece.

Still another provision of the present invention is to provide a new and improved method of removing material from a workpiece while monitoring the quality of the workpiece as set forth in the preceding paragraphs wherein the step of dividing each cycle of the cutting tool and workpiece into a plurality of increments includes the steps of dividing a cycle of the cutting tool and workpiece into a plurality of incremental movements.

A further provision of the present invention is to provide a method of removing material from a workpiece while monitoring the quality of the workpiece including the steps of: supporting a workpiece, supporting a cutting tool, rotating the the cutting tool relative to the workpiece, moving the cutting tool and workpiece relative to each other through a cycle, dividing each cycle of the cutting tool and workpiece into a plurality of increments, sensing the force required to rotate the cutting tool relative to the workpiece during each of the increments, setting force limits for different increments of the cycle, comparing the sensed force required to rotate and/or move the cutting tool relative to the workpiece with the set force limits and generating a first signal indicative of a workpiece of unacceptable quality if the sensed force is not within the set force limits.

Still another provision of the present invention is to provide a new and improved method of removing material from a workpiece while monitoring the quality of the workpiece wherein the step of sensing the force exerted between the tool and workpiece comprises the step of sensing the torque or force required to effect relative rotation of the tool and workpiece.

DESCRIPTION OF THE PREFERRED EMBODIMENT

Figure 1:
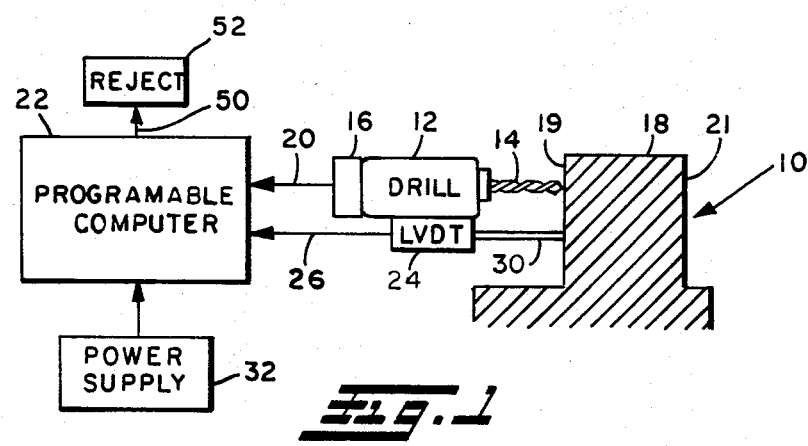
FIG. 1 is a schematic illustration of apparatus for removing material from a workpiece while monitoring the quality of the workpiece wherein the thickness of a wall portion of the workpiece is being monitored.

Referring to the FIGURES and more particularly FIG. 1, a workpiece 10 is disclosed which is adapted to have material removed therefrom by a drill 12. The drill 12 rotates a drill bit 14 in a well known manner and the drill bit 14 is disposed so as to penetrate and pass through the workpiece 10 upon relative rotation of the bit 14 and the workpiece 10. A transducer 16 is associated with the drill 12 to sense the torque required to effect rotation of the bit 14 as it passes through the workpiece 10. The torque or force signals monitored by the transducer 16 are directed along line 20 to a programmable controller 22. A linear variable differential transformer 24 is associated with the drill 12 and provides an output signal on line 26 which is directed to the programmable controller 22 and which is indicative of the position of the drill 12 with respect to the workpiece 10. The linear variable differential transformer 24 includes a probe 30 associated therewith which physically contacts a surface of the workpiece 10 and provides a variable output signal to the programmable controller 22 which is indicative of the relative position of the cutting tool 14 with respect to the workpiece 10. A power supply 32 is provided for energizing the programmable controller 22 in a well known fashion.

In the present example, illustrated in FIG. 1, the present system is utilized simultaneously with the drilling of a hole in a wall 18 to sense the wall thickness of the wall 18 of the workpiece 10 to ensure that the wall thickness is within predetermined limits. The torque required to effect rotation of the bit 14 will be very low prior to the bit 14 engaging with the wall portion 18 of the workpiece 10. As the bit penetrates the wall 18, the torque required to effect rotation of the bit 14 will increase to a higher, relatively constant, level until the bit 14 starts to exit from the wall portion 18. At that time, the torque required to effect rotation of the bit 14 will drop substantially. By sensing the torque required to effect rotation of the bit 14 as the bit penetrates and passes through the wall portion 18, various quality characteristics of the workpiece 10 can be determined to determine whether the workpiece 10 is an acceptable workpiece meeting predetermined quality standards. For example, the thickness of the wall 18 can be sensed or the hardness of the material forming the wall 18 can be sensed.

Figure 2:
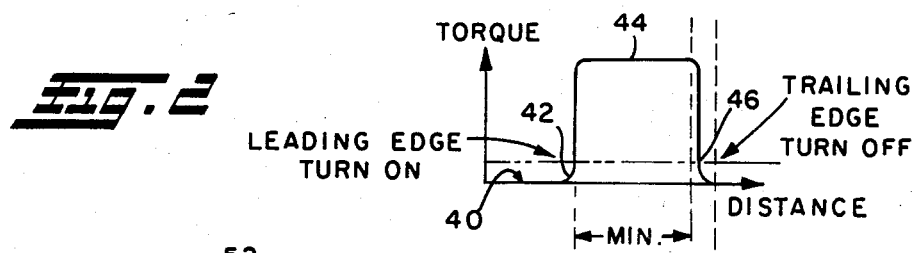
FIG. 2 is a torque or force-distance graph illustrating a hypothetical torque or force-distance signature for a tested workpiece of FIG. 1 of acceptable quality.

The programmable controller 22 is utilized to generate a torque-distance signature curve as is illustrated in FIG. 2. The torque-distance curve plots the torque sensed by the transducer 16 against the particular distance that the drill 12 travels as is sensed by the linear variable differential transformer 24.

When the drill 12 drills through the wall portion 18 of the workpiece 10, the drill 12 and workpiece 10 must move relative to each other through a predetermined cycle. This cycle will include the drill approaching the workpiece 10, the drill penetrating the workpiece 10 and then the drill exiting the workpiece 10 as it passes through the wall portion 18. One such complete movement of the drill 12 relative to the workpiece 10 is defined as a cycle. Each cycle will be broken into a plurality of increments during which the torque sensed by the transducer 16 is measured. In the preferred embodiment, the linear variable differential transformer 24 is disclosed as sensing the distance that the drill 12 moves relative to the workpiece 18. The distance moved during one complete cycle of the drill relative to the workpiece is divided into a plurality of distance increments and plotted with the sensed torque during each increment on the torque-distance curve of FIG. 2.

While the preferred embodiment discloses dividing the cycle of relative movement of the drill and workpiece into distance increments, it should be apparent that the time it takes to complete a full cycle could be broken into time increments and the torque measured at predetermined time periods throughout the cycle to sense the quality of the workpiece. Additionally, while a linear variable differential transformer 24 has been utilized to indicate distance, various other apparatus could be used to sense the relative movement of the drill 12 and workpiece 10 in a well known manner.

FIG. 2 illustrates a typical torque-distance curve for a drill 12 having a bit 14 which is adapted to penetrate a wall 18 of a workpiece 10. As the drill bit 14 approaches the wall portion 18 of the workpiece 10, no torque will be exerted on the drill bit 14 by the workpiece 10 and thus the portion 40 of the curve will be generated which is indicative of no torque being exerted between the workpiece and drill during initial movement of the drill toward the workpiece. Upon initial engagement of the bit 14 with the wall 18 of the workpiece 10, the torque will rapidly rise as at 42. This function is known as leading edge turn on and can be utilized by the programmable controller 22 to locate the exact distance that the bit 14 has travelled before it engages with the wall 18 of the workpiece 10 and can also be utilized to indicate the exact location of the surface 19 of the wall portion 18. As the bit 14 penetrates the wall 18 the torque exerted will be relatively high but constant as is exhibited at 44 in FIG. 2. When the bit 14 breaks through the surface 21 of the wall 18 of the workpiece 10 the torque exerted on the bit 14 will drop as is exhibited at 46 in FIG. 2. This function is known as trailing edge turn off.

The programmable controller 22 can thus sense the distance between where the drill bit 14 engages the surface 19 of with wall 18 and the distance where drill bit 14 breaks through surface 21 of the wall 18. Thus, in FIG. 2, the distance between the leading edge turn on at 42 and trailing edge turn off at 46 is indicative of the thickness of the wall portion 18. Maximum and minimum limits can be set for the thickness of the wall portion 18. This is schematically illustrated in FIG. 2 as the minimum and maximum distances located on the bottom of the torque distance graph. Both of these distances are measured from the leading edge turn on 42 which gives an indication of the position of the surface 19 of the wall portion 18 with which the bit 14 initially engages. Upon defining an acceptable workpiece, the minimum and maximum setpoints can be programmed into the programmable controller 22 which will then be able to sense whether the wall portion 18 is within acceptable quality standards as defined by the minimum and maximum distance set points. Measuring the torque output of transducer 16 and the position output of the linear variable distance transformer 24 enables, the programmable controller 22 to generate the torque-distance curve to sense the quality of the workpiece. The programmable controller 22 is operable to establish a reject signal on line 50 to a reject mechanism 52 to reject a workpiece 10 which is found not to be within acceptable preset standards. When programming the programmable controller 22, minimum and maximum torque measurements for particular increments can be set and the curve must be such that the trailing edge turn off occurs between the minimum and maximum set points for the workpiece to be considered acceptable.

Figure 3:
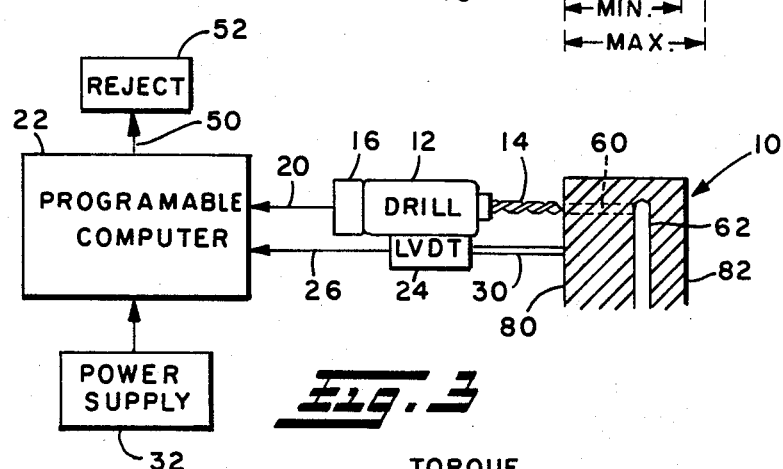
FIG. 3 is a schematic illustration of an apparatus for removing material from a workpiece wherein the workpiece to be monitored includes a workpiece in which it is desired to drill a cross port which is desired to intersect with an existing cross port.
Figure 4:
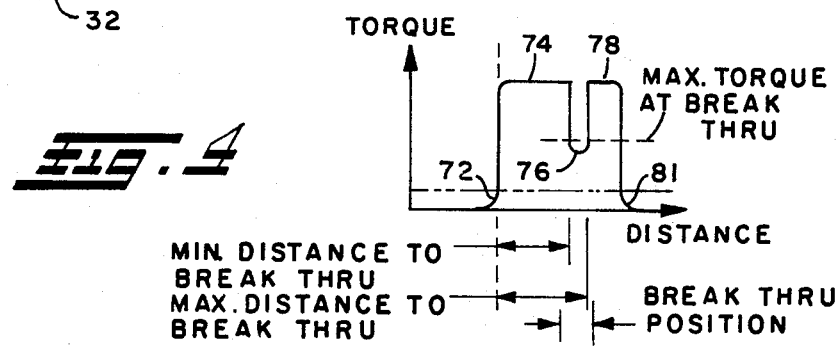
FIG. 4 is a torque or force-distance graph illustrating a hypothetical torque or force-distance signature for a tested workpiece of FIG. 3 of acceptable quality.

FIG. 3 illustrates another embodiment of the invention wherein like parts are identified by like numerals. In this embodiment it is desired to drill a cross port 60 into a existing cross port 62. It is desirable to check to ensure that the to be drilled cross port 60 actually engages with the existing bore 62 on a symmetrical basis, that the bore 62 exists at the proper location and that the length of the bore 60 is within acceptable limits. FIG. 4 illustrates a torque-distance curve of an acceptable workpiece.

As the drill bit 14 approaches the side surface 80 of the item 10, initial contact will establish the sharply uprising torque curve as at 72 for leading edge turn on. This measurement will be indicative of the location of the side wall 80 of the workpiece 10. Upon penetration of the drill bit 14 into the workpiece 10, the flat portion 74 of the torque-distance curve will be generated which is indicative of high torque which is relatively constant until the drill bit 14 enters the existing bore 62. Upon entering the existing bore 62, the amount of torque required for the drill bit 14 to rotate will be decreased and the torque distance curve will dip as at 76. Then, if it is desired to further penetrate the wall 82 of workpiece 10, a flat portion 78 will be established on the curve of FIG. 4 as the bit 12 further penetrates wall 82 and the portion 76 will be indicative of high but relatively constant torque. As the drill bit again breaks through the wall portion 82, the torque required to rotate drill 14 will drop as at 81 and trailing edge turn off will be accomplished. Measuring the torque at various increments of the cycle of the drill and workpiece 10, enables various quality control operations to be accomplished as the drill 14 penetrates the workpiece 10. Sensing the leading edge turn on 72 and the portion 76 of the curve allows the distance between the wall portion 80 and the bore 62 to be ascertained. Sensing the drop in torque between the portion 74 and the portion 76 of the curve, provides for a determination of whether the drill bit 14 is symmetrically penetrating the port 62. A maximum torque limit at breakthrough can be set to reject parts wherein the newly drilled bore 60 is no symmetrical with the bore 62 or when the bore 62 is not present in the workpiece. The length of the portion 78 will be indicative of the distance between the bore 62 and the wall surface 82. Minimum and maximum distances to breakthrough at bore 62 from the leading edge turn on 72 can be set as is illustrated in FIG. 4. These distances would indicate the minimum and maximum allowable distances between the wall 80 and the bore 62. While the minimum and maximum distances are set on the torque-distance curve, it should be appreciated that the programmable controller 22 senses the changes in torque at various increments in the workpiece such as at portions 72, 74, 76, 78 and 81 of the torque-distance curve to ascertain whether the distances actually measured are within the minimum and maximum setpoints.

While the present invention has been described relative to drilling it should be appreciated that it could be utilized to sense quality control on many types of workpieces wherein material is removed or cutting occurs. For example, when the present system is utilized with a milling machine, surface measurements can be made and other physical characteristics such as cross grooves on a workpiece could be sensed for quality control. The present invention is also applicable for milling, sawing, tapping, boring, turning, grinding or other cutting or material removal operations. In each case an acceptable workpiece will be defined and maximum or minimum torque or force limits set for various increments of the cycle through which the workpiece and cutting tool move. The set force or torque limits would be dependent upon the physical characteristics of an acceptable workpiece which are encountered by the tool as the tool moves through various increments of the cycle. If the torque limits are exceeded, the workpiece can be rejected by the reject mechanism 52 as being unacceptable.

From the foregoing it should be apparent that a new and improved method for removing material from a workpiece while monitoring the quality of the workpiece has been disclosed. The method includes supporting the workpiece 10 and a cutting tool 14 in a position in which they are adapted to engage with each other and cut or remove material from the workpiece 10. The cutting tool 14 and the workpiece 10 are moved relative to each other through a cycle to enable the cutting tool 14 to remove material from the workpiece 10. Each cycle of the cutting tool and workpiece is divided into a plurality of increments and the force or torque exerted between the tool and workpiece during each of the increments of the cycle is sensed. Set force limits are provided based upon the physical characteristics of an acceptable workpiece and the set force limits for various increments are compared with the sensed forces or torque exerted between the tool and workpiece to determine whether the workpiece is of acceptable quality. A signal is generated indicative of a workpiece of unacceptable quality if the sensed force or torque is not within the set force or torque limits.

What I claim is:

1. A method of removing material from a workpiece while monitoring the quality of the workpiece including the steps of:
   supporting a workpiece,
   supporting a cutting tool in a position in which it is adapted to engage with and cut said workpiece, moving said cutting tool and workpiece relative to each other through a cycle to enable said cutting tool to remove material from said workpiece, dividing each cycle of said cutting tool and workpiece into a plurality of increments, sensing the force exerted between said tool and workpiece during each of said increments of said cycle, setting force limits for different increments of said cycle, comparing said sensed force exerted between said tool and workpiece with said set force limits, and generating a first signal indicative of a workpiece of unacceptable quality if said sensed force is not within said set force limits.

2. A method of removing material from a workpiece while monitoring the quality of the workpiece as defined in claim 1, wherein said step of dividing each cycle of said cutting tool and workpiece into a plurality of increments includes the step of dividing a cycle of said cutting tool and workpiece into a plurality of incremental movements.

3. A method of removing material from a workpiece while monitoring the quality of the workpiece as defined in claim 1, wherein said step of dividing each cycle of said cutting tool and workpiece into a plurality of increments includes the steps of establishing a time period for the completion of one cycle of said workpiece and tool and dividing said established time period into a plurality of incremenal time periods.

4. A method of removing material from a workpiece while monitoring the quality of the workpiece as defined in claim 1, wherein said step of sensing the force exerted between said tool and workpiece includes the step of sensing the torque required to effect relative movement of said tool and workpiece.

5. A method of removing material from a workpiece while monitoring the quality of the workpiece including the steps of:

supporting a workpiece, supporting a tool in a position which is adapted to engage with and remove material from said workpiece, rotating the said tool relative to said workpiece, moving said tool and workpiece relative to each other through a cycle to enable said tool to remove material from said workpiece, dividing each cycle of said tool and workpiece into a plurality of increments, sensing the force required to rotate said tool relative to said workpiece during each of said increments of said cycle while said tool is removing material from the workpiece, setting force limits for different increments of said cycle, including the steps of: identifying physical characteristics of an acceptable workpiece, determining the position of said tool with respect to an acceptable workpiece during each of said increments of said cycle, determining the force required to rotate said tool relative to an acceptable workpiece to effect removal of material from an acceptable workpiece during predetermined increments of said cycle during which said tool engages with said indentified physical characteristics of said acceptable workpieces, and setting a maximum force limit for a particular increment of said cycle which is dependent upon said identified physical characteristic of an acceptable workpiece, comparing said sensed force required to rotate said tool relative to said workpiece with said set maximum force limit, and generating a first signal indicative of a workpiece of unacceptable quality if said sensed force is not within said set maximum force limit for a particular increment.

6. A method of removing material from a workpiece while monitoring the quality of the workpiece as defined in claim 5, wherein said step of setting force limits for different increments of said cycles includes the steps of:

identifying physical characteristics of an acceptable workpiece, determining the position of said tool with respect to an acceptable workpiece during each of said increments of said cycle.

determining the force required to rotate said tool relative to an acceptable workpiece to effect removal of material from an acceptable workpiece during predetermined increments of said cycle during which said tool engages with said identified physical characteristics of said acceptable workpiece, and setting a maximum force limit for a particular increment of said cycle which is dependent upon said identified physical characteristic of an acceptable workpiece.

7. A method of removing material from a workpiece while monitoring the quality of the workpiece as defined in claim 5, wherein said step of comparing said sensed force required to rotate said tool relative to said workpiece with said set maximum force limit includes the step of comparing the sensed force required to rotate said tool relative to the workpiece when said tool engages with said identified physical characteristics during a predetermined increment of said cycle with said maximum force limit for the corresponding increment of said cycle which is dependent upon said identified physical characteristic to determine whether the physical characteristic being sensed is indicative of an acceptable physical characteristic of the workpiece.

8. A method of removing material from a workpiece while monitoring the quality of the workpiece as defined in claim 5, wherein said step of dividing each cycle of said tool and workpiece into a plurality of increments includes the step of dividing a cycle of said tool and workpiece into a plurality of incremental movements.

9. A method of removing material from a workpiece while monitoring the quality of the workpiece as defined in claim 5, wherein said step of dividing each cycle of said tool and workpiece into a plurality of increments includes the steps of establishing a time period for the completion of one cycle of said workpiece and tool and dividing said estabished time period into a plurality of incremental time periods.

10. A method of removing material from a workpiece while monitoring the quality of the workpiece including the steps of:

supporting a workpiece, supporting a cutting tool in a position in which it is adapted to engage with and cut said workpieces, moving said cutting tool and workpiece relative to each other through a cycle to enable said cutting tool to remove material from said workpiece, dividing each cycle of said cutting tool and workpiece into a plurality of increments.

sensing the force exerted between said tool and workpiece during each of said increments of said cycle, setting force limits for different increments of said cycle, including the steps of: identifying physical characteristics of an acceptable workpiece, determining the position of said cutting tool with respect to an acceptable workpiece during each of said increments of said cycle, determining the force exerted between said acceptable workpiece and said tool to remove material from an acceptable workpiece during predetermined increments of said cycle during which said tool engages with said identified physical characteristics of said acceptable workpiece, and setting a maximum force limit for a particular increment of said cycle which is dependent upon said indentified physical characteristic of an acceptable workpiece, comparing said sensed force exerted between said tool and workpiece with said maximum force limit for a particular increment, and generating a first signal indicative of a workpiece of unacceptable quality if said sensed force is not greater than said maximum force limit.

11. A method of removing material from a workpiece while monitoring the quality of the workpiece as defined in claim 10 wherein said step of comparing said sensed force exerted between said tool and said workpiece with said set force limit includes the step of comparing the actual sensed force exerted between said tool and said workpiece when said tool engages with said identified physical characteristics during a predetermined increment of said cycle with said maximum force limit for the corresponding increment of said cycle which is dependent upon said identified physical characteristic to determine whether the physical characteristic being sensed is indicative of an acceptable physical characteristic of the workpiece.

* * * * *